(12) United States Patent
Lee et al.

(10) Patent No.: US 10,804,510 B2
(45) Date of Patent: Oct. 13, 2020

(54) BATTERY PACK INCLUDING A FIXING MEMBER

(71) Applicant: LG CHEM, LTD., Seoul (KR)

(72) Inventors: Han-Sol Lee, Daejeon (KR); Jin-Hak Kong, Daejeon (KR); Su-Hang Lee, Daejeon (KR); Kyu-Hyun Choi, Daejeon (KR); Yong-Seok Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 152 days.

(21) Appl. No.: 16/063,859

(22) PCT Filed: Oct. 27, 2017

(86) PCT No.: PCT/KR2017/012012
§ 371 (c)(1),
(2) Date: Jun. 19, 2018

(87) PCT Pub. No.: WO2018/084501
PCT Pub. Date: May 11, 2018

(65) Prior Publication Data
US 2019/0006646 A1  Jan. 3, 2019

(30) Foreign Application Priority Data

Nov. 4, 2016  (KR) .......................... 10-2016-0146828

(51) Int. Cl.
*H01M 2/10* (2006.01)
*H01M 2/02* (2006.01)

(52) U.S. Cl.
CPC ....... *H01M 2/1077* (2013.01); *H01M 2/0212* (2013.01); *H01M 2/10* (2013.01); *H01M 2/1083* (2013.01); *H01M 2220/20* (2013.01)

(58) Field of Classification Search
CPC ............ H01M 2/1077; H01M 2/1083; H01M 10/0481; H01M 2/10
See application file for complete search history.

(56) References Cited

U.S. PATENT DOCUMENTS

2001/0007728 A1* 7/2001 Ogata ................. H01M 2/1077
429/120
2010/0124693 A1* 5/2010 Kosugi ............... G01R 31/3644
429/92

(Continued)

FOREIGN PATENT DOCUMENTS

JP  2011-134541 A  7/2011
JP  2011-142077 A  7/2011

(Continued)

OTHER PUBLICATIONS

International Search Report issued in PCT/KR2017/012012 (PCT/ISA/210), dated Mar. 5, 2018.

*Primary Examiner* — Imran Akram
(74) *Attorney, Agent, or Firm* — Birch, Stewart, Kolasch & Birch, LLP

(57) ABSTRACT

Disclosed is a battery pack, which may effectively prevent a bending phenomenon caused by a load while ensuring excellent assembling and compatibility and light weight, and a vehicle including the battery pack. The battery pack includes: a plurality of battery modules including at least one secondary battery accommodated in a module case and a side surface coupling unit provided at an outer side portion of the module case, the plurality of battery modules being arranged in a lateral direction so that side surfaces thereof face each other with intervals therebetween; and a fixing member having an interposing portion interposed between side surfaces of two adjacent battery modules and coupled to (Continued)

the side surface coupling units of the two adjacent battery modules so that two or more battery modules are coupled and fixed.

11 Claims, 10 Drawing Sheets

(56) References Cited

U.S. PATENT DOCUMENTS

| | | | | |
|---|---|---|---|---|
| 2010/0255355 A1* | 10/2010 | Park | ............... | H01M 2/206 429/91 |
| 2010/0266889 A1* | 10/2010 | Kim | ............... | H01M 2/202 429/158 |
| 2011/0070474 A1* | 3/2011 | Lee | ............... | B60L 3/0046 429/120 |
| 2011/0097620 A1* | 4/2011 | Kim | ............... | H01M 2/204 429/161 |
| 2011/0104543 A1* | 5/2011 | Kim | ............... | H01M 2/1077 429/99 |
| 2011/0117419 A1 | 5/2011 | Lee et al. | | |
| 2011/0151308 A1 | 6/2011 | Yoon | | |
| 2011/0165451 A1 | 7/2011 | Kim et al. | | |
| 2012/0003520 A1* | 1/2012 | Lee | ............... | H01M 10/0585 429/83 |
| 2012/0070718 A1* | 3/2012 | Motohashi | ............... | H01M 2/1077 429/156 |
| 2012/0263991 A1 | 10/2012 | Temmyo et al. | | |
| 2012/0308866 A1 | 12/2012 | Nishida et al. | | |
| 2013/0040174 A1 | 2/2013 | Takasaki et al. | | |
| 2013/0059180 A1 | 3/2013 | Yang et al. | | |
| 2013/0224524 A1* | 8/2013 | Nam | ............... | H01M 10/6555 429/7 |
| 2014/0234691 A1* | 8/2014 | Lee | ............... | H01M 10/625 429/120 |
| 2014/0255731 A1* | 9/2014 | Byun | ............... | H01M 2/1061 429/7 |
| 2014/0356668 A1* | 12/2014 | Kim | ............... | H01M 2/1016 429/90 |
| 2014/0356691 A1* | 12/2014 | Ahn | ............... | H01M 2/305 429/158 |
| 2015/0086846 A1* | 3/2015 | Baek | ............... | H01M 2/307 429/159 |
| 2015/0140393 A1* | 5/2015 | Yamamoto | ............... | H01M 2/305 429/121 |
| 2015/0270514 A1* | 9/2015 | Baek | ............... | H01M 2/1061 429/151 |
| 2016/0006006 A1 | 1/2016 | Motokawa et al. | | |
| 2017/0194674 A1* | 7/2017 | Lee | ............... | H01M 2/34 |
| 2017/0309876 A1* | 10/2017 | An | ............... | H01M 10/4221 |

FOREIGN PATENT DOCUMENTS

| | | |
|---|---|---|
| JP | 2014-199716 A | 10/2014 |
| KR | 10-2011-0055360 A | 5/2011 |
| KR | 10-2011-0081023 A | 7/2011 |
| KR | 10-2012-0005727 A | 1/2012 |
| KR | 10-2014-0008123 A | 1/2014 |
| WO | WO 2012/073415 A1 | 6/2012 |
| WO | WO 2013/021592 A1 | 2/2013 |
| WO | WO 2014/125807 A1 | 8/2014 |

* cited by examiner

BATTERY PACK INCLUDING A FIXING MEMBER

TECHNICAL FIELD

The present application claims priority to Korean Patent Application No. 10-2016-0146828 filed on Nov. 4, 2016 in the Republic of Korea, the disclosures of which are incorporated herein by reference.

The present disclosure relates to a battery pack including at least one battery module, and more particularly, to a battery pack having increased rigidity, excellent assembling and compatibility, and light weight, and a vehicle including the battery pack.

BACKGROUND ART

Currently, nickel-cadmium batteries, nickel-metal hydride batteries, nickel-zinc batteries, lithium secondary batteries, and the like are used as commercial secondary batteries. Among them, lithium secondary batteries have little to memory effect in comparison with nickel-based secondary batteries, and thus lithium secondary batteries are gaining a lot of attention for their advantages of free charging or discharging, low self-discharging, and high energy density.

A lithium secondary battery generally uses lithium oxide and carbonaceous material as a cathode active material and anode active material, respectively. The lithium secondary battery includes an electrode assembly in which a cathode plate and an anode plate respectively coated with the cathode active material and the anode active material are disposed with a separator being interposed between them, and an exterior which seals and accommodates the electrode assembly together with an electrolyte.

Generally, a lithium secondary battery may be classified into a can-type secondary battery where the electrode assembly is included in a metal can and a pouch-type battery where the electrode assembly is included in a pouch of an aluminum laminate sheet, depending on the shape of the exterior.

In these days, secondary batteries are widely used not only for small-sized devices such as portable electronic devices but also for middle-sized or large-sized devices such as vehicles and power storages. The secondary battery is provided in a battery pack and mounted to a middle-sized or large-sized device and a large number of secondary batteries are included in the battery pack and electrically connected to each other to increase the capacity and output of the battery pack. Here, the plurality of secondary batteries may be accommodated in a single module case to configure one battery module, and a plurality of battery modules may be provided in a single pack case to configure one battery pack.

FIG. 1 is a front view schematically showing a partial configuration of a conventional battery pack.

Referring to FIG. 1, a plurality of the battery modules 10 may be arranged in a lateral direction, namely in a side direction, at predetermined intervals from each other. In addition, the plurality of battery modules 10 may be mounted to an upper portion of a lower plate 20 that configures a lower part of the pack case.

At this time, if the lower plate is not placed on a wide and hard region like the ground but just a specific portion thereof is supported as shown in the figure, the lower plate may be suspended downward by a load of the battery module or the like as indicated by an arrow.

FIG. 2 is a front view schematically showing an example when a bending phenomenon occurs at the lower plate of the battery pack depicted in FIG. 1.

Referring to FIG. 2, a bending phenomenon may occur at the lower plate 20 since the load imposed by the battery module 10 is concentrated on a central portion of the lower plate 20, except for both ends thereof supported in the upper direction. In particular, when the battery pack is mounted to a vehicle, an upper portion of the battery pack may be fixed to a vehicle body or only a lower portion of the battery pack may be partially fixed to the vehicle body. In this case, the bending phenomenon in the downward direction may occur at the portion of the lower plate 20 not supported by the vehicle body. Moreover, when the battery pack is mounted to a vehicle or the like, the bending phenomenon caused by the load may occur more seriously and quickly because the battery pack is exposed to a lot of vibration.

If the bending phenomenon occurs at the lower plate 20 as described above, a terminal connection structure such as a module bus bar between the battery modules 10 may be broken, and the power supply of the battery pack may become impossible or weak. Especially, if the power supply of the battery pack becomes impossible or weak while the vehicle is running, a traffic accident may occur, which may cause serious personal injury and property damage. In addition, if the terminal connection between the battery modules 10 is broken, an electric short circuit may occur inside the battery pack, which may cause a fire or an electric shock due to the battery pack. Moreover, the bending phenomenon of the lower plate 20 may damage the pack case, for example the lower plate, and may cause damage due to the contact between the battery modules. In particular, if the battery pack is used for a vehicle that is exposed to a lot of vibrations, the battery modules may be damaged more seriously due to the vibrations. In addition, in this case, the internal and external structures of the battery pack may be deformed to damage the battery pack as well as the vehicle body.

DISCLOSURE

Technical Problem

The present disclosure is designed to solve the problems of the related art, and therefore the present disclosure is directed to providing a battery pack, which may effectively prevent a bending phenomenon caused by a load while ensuring excellent assembling and compatibility and light weight, and a vehicle including the battery pack.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack, comprising: a plurality of battery modules including at least one secondary battery accommodated in a module case and a side surface coupling unit provided at an outer side portion of the module case, the plurality of battery modules being arranged in a lateral direction so that side surfaces thereof face each other with intervals therebetween; and a fixing member having an interposing portion interposed between side surfaces of two adjacent battery modules and coupled to the side surface coupling units of the two adjacent battery modules so that two or more battery modules are coupled and fixed.

Here, the side surface coupling unit of each battery module may be provided at a side upper portion of the module case and has a protruding shape that protrudes in a lateral direction and then is bent upwards.

In addition, the interposing portion of the fixing member may have an insert groove elongating in an upper and lower direction and having an open bottom, and the side surface coupling units of the two adjacent battery modules may be inserted into the insert groove of the fixing member.

In addition, the fixing member may have two insert grooves so that the side surface coupling units of different battery modules are inserted into the two insert grooves, respectively.

In addition, both surfaces of the interposing portion of the fixing member may be respectively in contact with side surfaces of the two battery modules.

In addition, the side surface coupling unit of each battery module may have a bent plate shape to face a side surface coupling unit of an adjacent battery module.

In addition, the side surface coupling unit of each battery module may have a bent plate shape so that the side surface coupling units of adjacent battery modules are provided at different locations in a front and rear direction of the battery modules.

In addition, each battery module may include an upper surface coupling unit formed at an upper outer portion of the module case, and the fixing member may further include a placing portion placed on upper surfaces of two adjacent battery modules and coupled to the upper surface coupling units of the two adjacent battery modules.

In addition, the upper surface coupling unit may have a groove shape that is concave downwards, and the placing portion may have a protrusion shape that is partially convex downwards.

In addition, the placing portion may have a lying-down plate shape, and the interposing portion may have a rod shape standing perpendicular to the placing portion at a central lower end of the placing portion.

In addition, the plurality of battery modules arranged in the lateral direction may be arranged in two or more rows in the front and rear direction, and the fixing member may couple and fix battery modules arranged in different rows adjacent to each other.

In addition, the fixing member may include two interposing portions so that one interposing portion is coupled to a pair of battery modules and the other interposing portion is coupled to another pair of battery modules in an adjacent different row, and further include a connection portion elongating in a front and rear direction of the battery module so that both ends of the connection portion are respectively connected and fixed to the interposing portions located at the pairs of battery modules in different rows.

In another aspect of the present disclosure, there is also provided a vehicle, comprising the battery pack according to the present disclosure.

Advantageous Effects

According to an embodiment of the present disclosure, the bending phenomenon caused by a load may be effectively prevented.

In particular, when a plurality of battery modules are arranged in a horizontal direction on a lower plate that configures a bottom surface of a pack case, a geometrical moment of inertia of the battery pack may increase according to the present disclosure, thereby increasing flexural rigidity of the battery pack in a downward direction.

Further, when a battery pack is used for a vehicle, a large number of secondary batteries may be mounted to cause a great bending phenomenon due to the load of the battery module, and also the bending phenomenon may become more serious due to vibration or shock. However, in the battery pack of the present disclosure, since both the top end and the bottom end of the battery pack are connected, the rigidity against the up and down movement of the battery pack is further increased, and thus the bending phenomenon of the lower plate caused by load, vibration or shock may be prevented more effectively.

Thus, in the battery pack of the present disclosure, it is possible to prevent a terminal connection portion between the battery modules from being damaged due to the bending phenomenon of the lower plate. Therefore, according to an embodiment of the present disclosure, it is possible to prevent that the power supply of the battery pack becomes impossible or weak due to the bending phenomenon or an electrical short circuit, electric leakage and so on occurs due to the bending phenomenon.

In addition, since the deformation of the internal and external structures of the battery pack due to the bending phenomenon of the lower plate is prevented, it is possible to prevent the battery pack and a vehicle including the battery pack from being damaged.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 3:
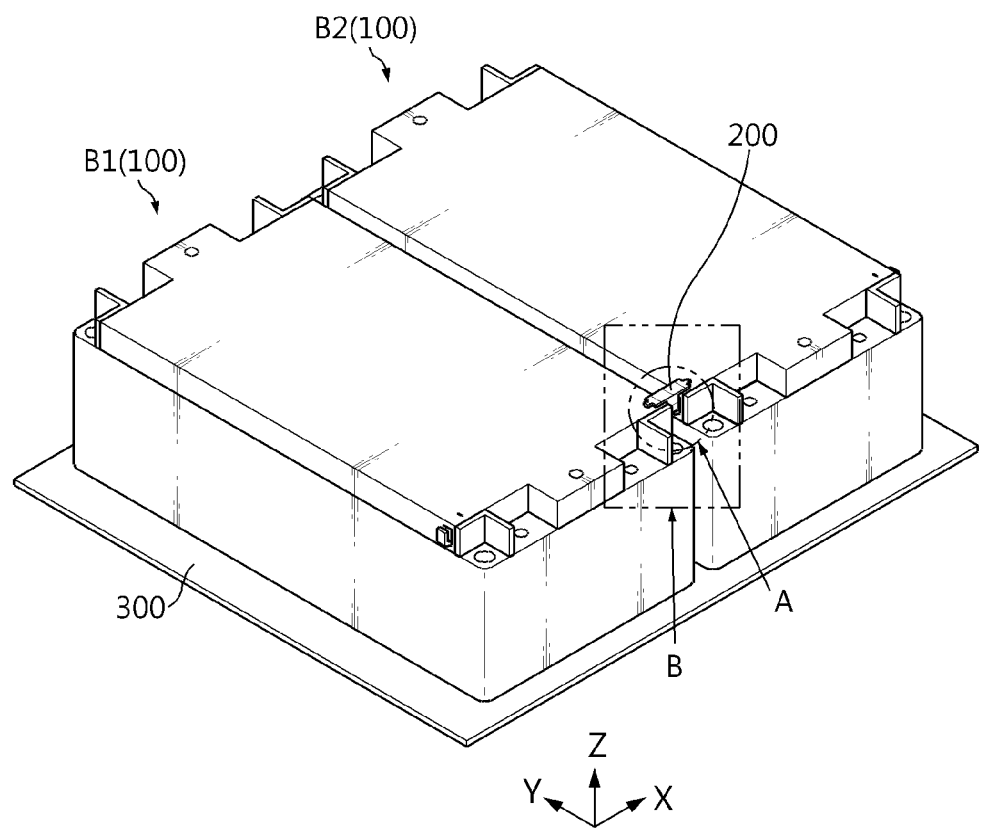
FIG. 3 is a perspective view schematically showing a partial configuration of a battery pack according to an embodiment of the present disclosure.

FIG. 3 is a perspective view schematically showing a partial configuration of a battery pack according to an embodiment of the present disclosure.

Referring to FIG. 3, a battery pack according to the present disclosure may include a battery module 100 and a fixing member 200.

The battery module 100 may include at least one secondary battery therein. Here, the secondary battery may be a pouch-type secondary battery, but the present disclosure is not limited thereto.

The secondary battery may include an electrode assembly, an electrolyte and an exterior. Here, the electrode assembly is an assembly of electrodes and a separator and may be configured so that at least one positive electrode plate and at least one negative electrode plate are disposed with a separator interposed therebetween. In addition, each electrode plate of the electrode assembly includes an electrode tab that may be connected to an electrode lead. In particular, in case of a pouch-type secondary battery, at least one electrode tab may be connected to the electrode lead, and the electrode lead is interposed between pouch exteriors so that its one end is exposed to the outside to serve as an electrode terminal. The exterior has an empty space therein to accommodate the electrode assembly and the electrolyte and may have a sealed form. The exterior may be made of a metal material in the case of a can-type secondary battery, and the exterior may include an outer insulating layer, a metal layer and an inner adhesive layer in the case of a pouch-type secondary battery.

The configuration of the secondary battery is obvious to those skilled in the art and thus not described in detail here. In addition, various kinds of secondary batteries known in the art at the time of filing of this application may be employed for the battery pack according to the present disclosure.

The battery module 100 may include a module case to accommodate the secondary battery. That is, the module case may be regarded as configuring an outer portion or an outer surface of the battery module 100, and at least one secondary battery may be accommodated in the module case. In particular, when a plurality of secondary batteries are provided in the battery module 100, the plurality of secondary batteries may be stacked in at least one direction. At this time, when the secondary batteries provided in the battery module 100 are pouch-type secondary batteries, a plurality of stacking cartridges configured to be stacked with one another and having frames provided to rims of the pouch-type secondary batteries may be further provided to the battery module 100 so that the pouch-type secondary batteries are stacked more easily and more firmly.

The plurality of secondary batteries included in the battery module 100 may be electrically connected to each other in series and/or in parallel. In addition, a module terminal (+ terminal, − terminal) may be provided to an outer portion of the module case of the battery module 100, for example at a front upper portion of the module case, and be electrically connected to the secondary batteries in the battery module 100. In addition, a bus bar or the like may be connected to the module terminal for connecting the battery module 100 to another battery module or an external device.

A plurality of battery modules 100 may be provided in the battery pack. In addition, the plurality of battery modules 100 may be arranged in a lateral direction so that their sides face each other. For example, as shown in FIG. 3, the battery pack may include at least two battery modules 100. At this time, two battery modules 100 may be arranged in the lateral direction so that a right side surface and a left side surface thereof face each other.

Here, when the battery module 100 is formed in a substantially hexahedral shape, the side surface of the battery module 100 may be regarded as representing at least some of four surfaces located on the sides thereof, except for top and bottom surfaces. In particular, in this specification, for convenience of explanation, unless otherwise specified, relatively large two surfaces are referred to as side surfaces and relatively narrow two surfaces are referred to as front and rear surfaces, among the four surfaces located at the side portions. For example, as shown in FIG. 3, when two battery modules 100 are arranged in the lateral direction such that their wide side surfaces face each other, two surfaces disposed to face each other in the X-axis direction in each battery module 100 is referred to as side surfaces, namely a left side surface and a right side surface. In addition, in the battery module 100, two surfaces facing each other in a front and rear direction, namely in the Y-axis direction, are referred to as front and rear surfaces.

In addition, in the specification, unless otherwise specified, the X-axis direction of FIG. 3 may be called a lateral (right and left) direction, the Y-axis direction may be called a front and rear direction, and the Z-axis direction may be called an upper and lower direction. Thus, the battery module 100 of FIG. 3 may be regarded as having a rectangular parallelepiped shape whose length in the front and rear direction is longer than the direction in the lateral direction. In addition, the plurality of battery modules 100 may be regarded as being arranged side by side in the lateral direction so that their left and right side surfaces face each other.

The battery modules 100 may be spaced apart from each other by a predetermined distance. For example, as shown in FIG. 3, two battery modules may be disposed to be spaced apart from each other in the horizontal direction (in the lateral direction) so that an empty space is formed between the left battery module B1 and the right battery module B2.

According to this configuration of the present disclosure, the space between the battery modules 100 serves as a cooling channel and allows a refrigerant such as air to flow between the battery modules 100, thereby stably ensuring the cooling performance of the battery pack. In addition, when vibration, side impact or the like is applied to the battery pack, the space between the battery modules 100 may serve as a buffer space for preventing the vibration, impact or the like from being transferred between the battery modules 100.

In particular, in the battery pack according to the present disclosure, the battery module 100 may include a side surface coupling unit. This will be described in more detail with reference to FIG. 4.

Figure 4:
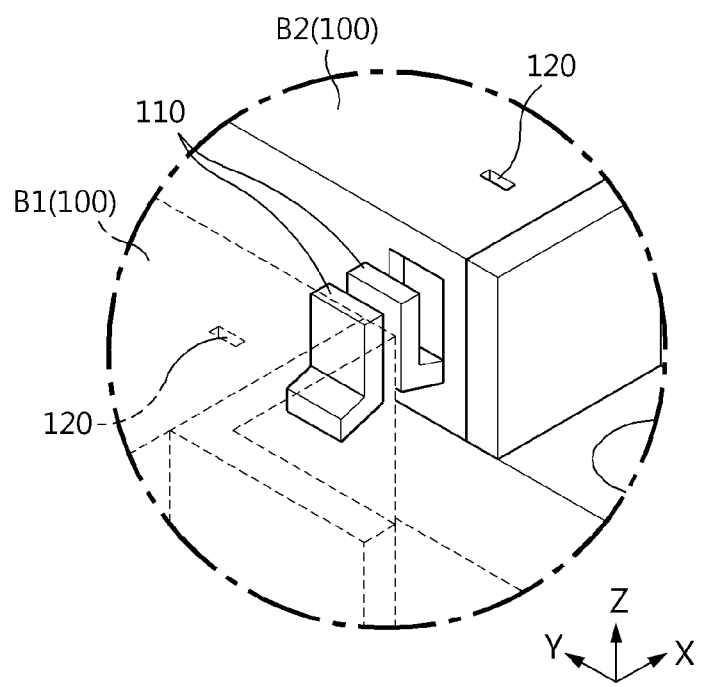
FIG. 4 is an enlarged view showing a portion A of FIG. 3 from which the fixing member is removed.

FIG. 4 is an enlarged view showing a portion A of FIG. 3 from which the fixing member 200 is removed. However, in FIG. 4, for convenience, some components of the battery module are shown with dotted lines, and the side surface coupling unit is shown with solid lines even if it is hidden by other components. This is applied similarly to some of other drawings.

Referring to FIGS. 3 and 4, the side surface coupling unit 110 may be located at an outer side portion of the module case, namely at an outer side portion of the battery module 100. A side surface of the battery module 100 may face a side surface of another battery module 100. Thus, the side surface coupling unit 110 may also be regarded as being located at a surface of the battery module 100 that faces another battery module 100.

For example, as shown in FIGS. 3 and 4, when two battery modules (a left battery module B1 and a right battery module B2) are disposed so that a right side surface and a left side surface thereof face each other, the side surface coupling unit 110 may be formed at the right side surface of the left battery module B1 and the left side surface of the right battery module B2, respectively.

In addition, a fixing member 200 may be coupled to the side surface coupling unit 110 of the battery module 100.

Figure 5:
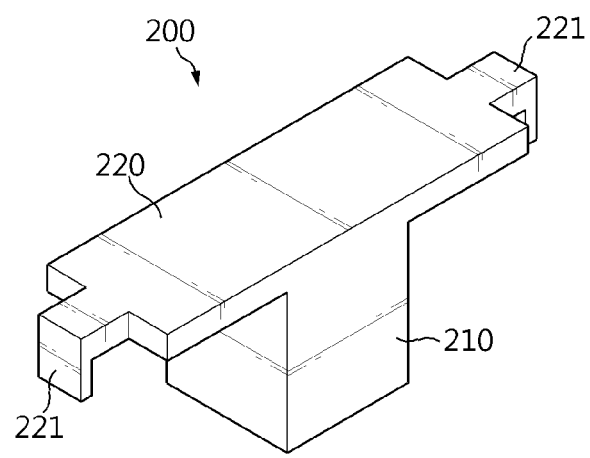
FIG. 5 is a perspective view schematically showing the fixing member according to an embodiment of the present disclosure, observed from the above.
Figure 6:
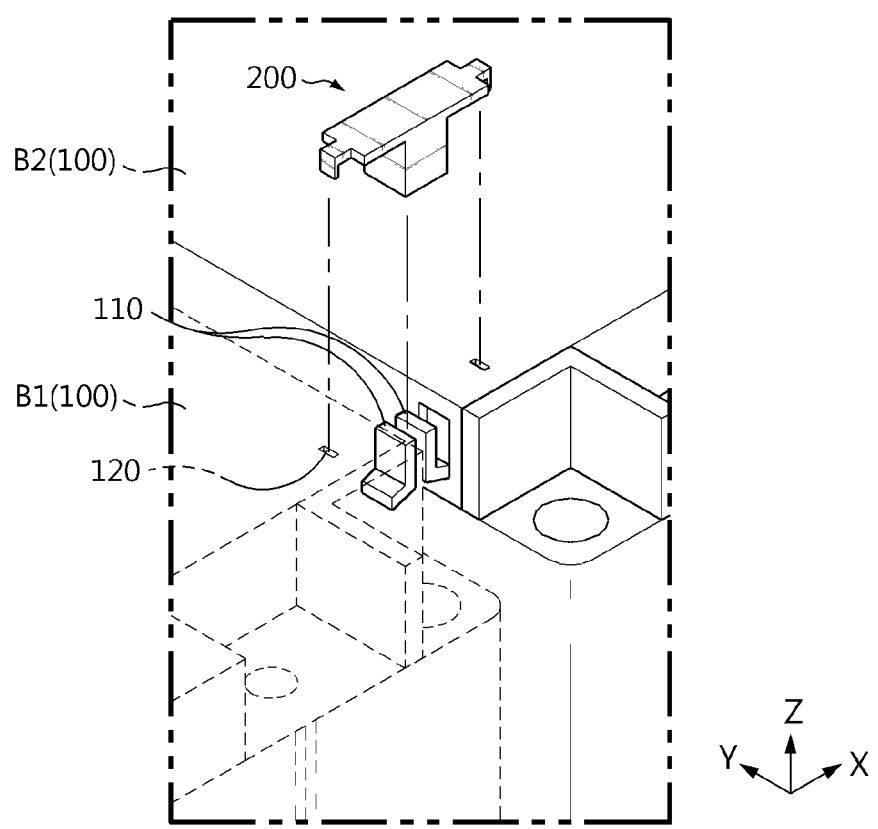
FIG. 6 is a partial perspective view schematically showing that the fixing member according to an embodiment of the present disclosure is mounted to a battery module.
Figure 7:
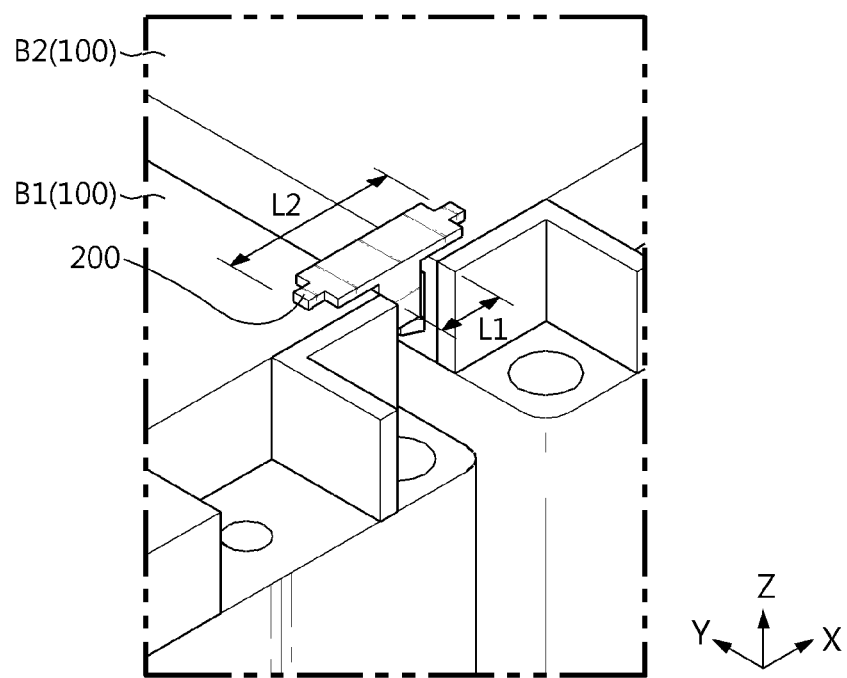
FIG. 7 is a partial perspective view schematically showing a state after the fixing member according to an embodiment of the present disclosure is mounted to the battery module.

FIG. 5 is a perspective view schematically showing the fixing member 200 according to an embodiment of the present disclosure, observed from the above. In addition, FIG. 6 is a partial perspective view schematically showing that the fixing member 200 according to an embodiment of the present disclosure is mounted to the battery module 100, and FIG. 7 is a partial perspective view schematically showing a state after the fixing member 200 according to an embodiment of the present disclosure is mounted to the battery module 100.

Referring to FIGS. 3 and 5 to 7, the fixing member 200 may couple and fix two or more battery modules 100 to each other.

In particular, the fixing member 200 may include an interposing portion 210. The interposing portion 210 may be interposed between the side surfaces of the two battery modules 100. For example, in the configurations of FIGS. 3 and 4 and FIGS. 6 and 7, the two battery modules B1, B2 are adjacent to each other, and the interposing portion 210 of the fixing member 200 may be inserted between the side surfaces of the two adjacent battery modules B1, B2.

In addition, the interposing portion 210 of the fixing member 200 may be coupled to the side surface coupling units 110 of the two adjacent battery modules 100. For example, seeing the configurations of FIGS. 3 and 4 and FIGS. 6 and 7, the interposing portion 210 may be commonly coupled to the side surface coupling unit 110 provided at the right side surface of the left battery module B1 and the side surface coupling unit 110 provided at the left side surface of the right battery module B2. Thus, by coupling the interposing portion 210 of the fixing member 200 and the side surface coupling units 110 of the two adjacent battery modulus B1, B2, two or more battery modules may be coupled and fixed to each other.

The fixing member 200 may be made of a metal material such as steel to secure rigidity. However, the present disclosure is not necessarily limited to the specific material of the fixing member 200, and the fixing member 200 may be made of various other materials. For example, the fixing member 200 may be made of a plastic material with electrical insulation. In this case, the electrical insulation between the battery modules 100 may be more stably secured.

Preferably, the side surface coupling unit 110 of the battery module 100 may be provided at a side upper portion of the module case. For example, seeing the configuration of FIG. 4, the side surface coupling unit 110 of the left battery module B1 may be located at an upper portion of the right side surface of the left battery module B1. In addition, the side surface coupling unit 110 of the right battery module B2 may be located at an upper portion of the left side surface of the right battery module B2.

In this configuration of the present disclosure, the fixing member 200 may be coupled to the side surface coupling unit 110 easily. That is, a worker may easily assemble the side surface coupling unit 110 and the fixing member 200 by approaching the fixing member 200 to the upper portion of the battery module 100 and coupling the fixing member 200 to the side surface coupling unit 110 provided at the side upper portion of the battery module 100.

Here, the side surface coupling unit 110 may be configured to protrude out of the battery module 100. In particular, the side surface coupling unit 110 may be configured to protrude laterally and then be bent upwards.

For example, seeing the configuration of FIG. 4, the side surface coupling unit 110 of the left battery module B1 may be configured to protrusively extend from the right side surface of the module case of the left battery module B1 in the right horizontal direction and then be bent at about 80 to 90 degrees so as to protrusively extend upwards. Also, here, the side surface coupling unit 110 of the right battery module B2 may be configured to protrusively extend in the left horizontal direction on the left side surface of the module case of the right battery module B2 and then be bent by about 80 to 90 degrees so as to protrusively extend upwards.

At this time, the height of an end of the side surface coupling unit 110, namely the height of a top portion thereof, may be lower than the height of the top surface of the battery module 100. In this case, it is possible to prevent the side surface coupling unit 110 from protruding above the battery module 100. Thus, it is possible to prevent or minimize the increase of the vertical height of the battery pack due to the side surface coupling unit 110 and the fixing member 200, and also it is possible to prevent the side surface coupling unit 110 from interfering with other components of the battery pack located above the battery module 100.

In this configuration, the interposing portion 210 of the fixing member 200 may be configured to elongate in the upper and lower direction. For example, the interposing portion 210 of the fixing member 200 may have a bar shape elongating in the upper and lower direction as shown in FIGS. 5 and 6.

In addition, the interposing portion 210 of the fixing member 200 may have an insert groove formed therein. This will be described in more detail with reference to FIG. 8.

Figure 8:
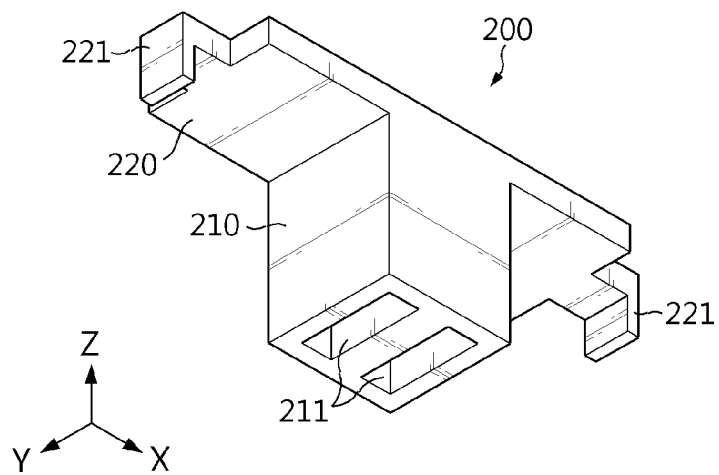
FIG. 8 is a perspective view schematically showing the fixing member according to an embodiment of the present disclosure, observed from the below.

FIG. 8 is a perspective view schematically showing the fixing member 200 according to an embodiment of the present disclosure, observed from the below.

Referring to FIG. 8, the fixing member 200 may have the interposing portion 210 elongating in the upper and lower direction, and an insert groove 211 may be formed in the interposing portion 210. In particular, the insert groove 211 of the interposing portion 210 may be formed to have an open bottom. That is, the interposing portion 210 may have an opening at a lower end thereof, and the insert groove 211 may be formed extending from the opening to a predetermined height in the upward direction.

In addition, the side surface coupling unit 110 of the battery module 100 may be inserted into the insert groove 211 of the fixing member 200. In particular, the side surface coupling units 110 of two adjacent battery modules 100 may be coupled to one fixing member 200. That is, by inserting the adjacent two side surface coupling units 110 into the insert groove 211 formed in one interposing portion 210, the side surface coupling units 110 of different battery modules 100 may be fixed together. For example, seeing the configuration depicted in FIGS. 6 and 7, the right side surface coupling unit 110 of the left battery module B1 and the left side surface coupling unit 110 of the right battery module B2 may be inserted into the insert groove 211 formed in the interposing portion 210 of one fixing member 200 at the same time so that the left battery module B1 and the right battery module B2 are coupled and fixed together.

According to the configuration of the present disclosure, the fixing member 200 may be coupled to the side surface coupling unit 110 more easily. That is, in the above configuration, as shown in FIG. 6, the fixing member 200 is just moved from the upper portion of the battery module 100 to the lower portion thereof so that the interposing portion 210 is inserted into the space between the battery modules 100, thereby easily coupling the battery modules 100 by the fixing member 200.

Also, according to the configuration of the present disclosure, the fixing member 200 need not be inserted into the inner space of the battery module 100, and thus it is possible to alleviate or eliminate the problem that the fixing member 200 reduces the energy density of the battery module 100 or interferes with components in the battery module 100.

In addition, according to the configuration of the present disclosure, since the side surface coupling unit 110 protrudes out of the battery module 100, particularly into the space between the adjacent battery modules 100, a cooling channel through which a cooling fluid such as air may flow is easily formed in the space between the battery modules 100. Also, the space between the battery modules 100 formed by the side surface coupling unit 110 may serve as a buffering space for buffering the battery pack when a vibration, impact or the like is applied thereto.

Preferably, in the above configuration, two or more insert grooves 211 may be formed in one interposing portion 210. The insert groove 211 may be configured so that side surface coupling units 110 of different battery modules 100 are inserted therein, respectively.

For example, as shown in FIG. 8, two insertion grooves 211 spaced apart from each other by a predetermined distance in the lateral direction may be formed in the interposing portion 210 of one fixing member 200 so that the side surface coupling units 110 of different battery modules 100 are coupled thereto, respectively. That is, the side surface coupling unit 110 of the left battery module B1 in FIG. 4 may be inserted into the left insert groove 211 of the fixing member 200 in FIG. 8, and the side surface coupling unit 110 of the right battery module B2 in FIG. 4 may be inserted into the right insert groove 211 of the fixing member 200 in FIG. 8.

According to the configuration of the present disclosure, even though two side surface coupling units 110 are inserted into one interposing portion 210, they are inserted into different insert grooves 211, and thus the side surface coupling units 110 may be fit into the insert grooves 211 of the interposing portion 210 more firmly. In other words, according to the configuration of the present disclosure, since the side surface coupling units 110 having a protruding shape do not move much in the inner space of the insert grooves 211 of the interposing portion 210, the side surface coupling unit 110 may be confined stronger by the insert grooves 211 of the interposing portion 210.

However, the present disclosure is not necessarily limited to the number of the insert grooves 211. For example, it is also possible that only one insert groove 211 is formed in one interposing portion 210, and two side surface coupling units 110 adjacent to the one insert groove 211 are inserted therein.

Also preferably, both surfaces of the interposing portion 210 of the fixing member 200 may be in contact with the side surfaces of two battery modules 100, respectively.

For example, seeing the configuration depicted in FIGS. 6 and 7, the interposing portion 210 of the fixing member 200 may be formed in a substantially bar-type rectangular parallelepiped shape, and an insert groove 211 may be formed therein so that the side surface coupling unit 110 of the left battery module B1 and the side surface coupling unit 110 of the right battery module B2 may be inserted therein. At this time, the left surface of the interposing portion 210 may be in contact with the right surface of the left battery module B1, and the right surface of the interposing portion 210 may be in contact with the left surface of the right battery module B2.

Figure 1:
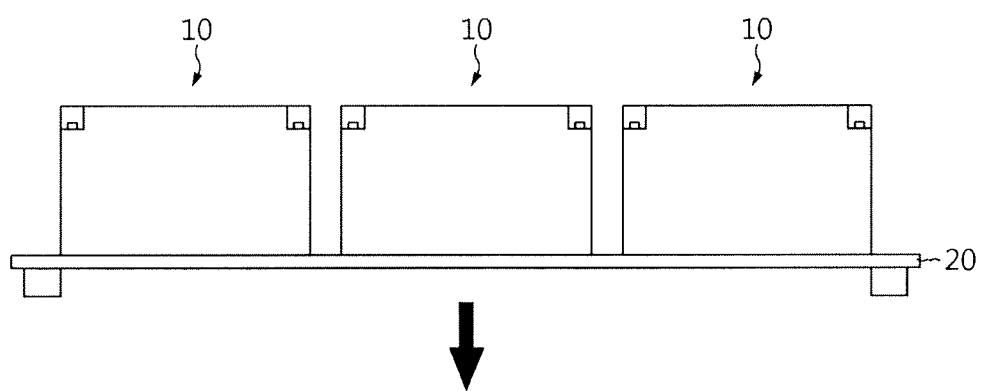
FIG. 1 is a front view schematically showing a partial configuration of a conventional battery pack.
Figure 2:
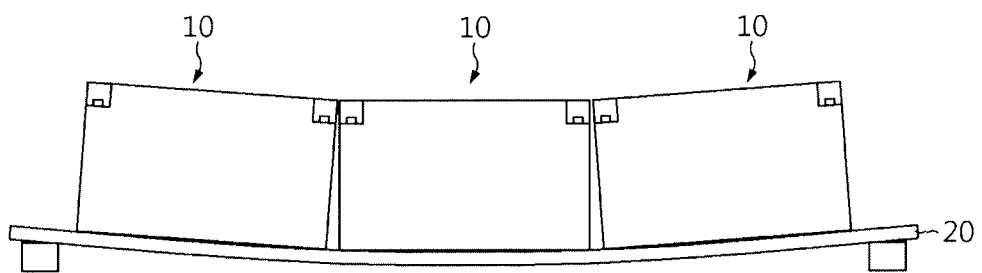
FIG. 2 is a front view schematically showing an example when a bending phenomenon occurs at the lower plate of the battery pack depicted in FIG. 1.

According to the configuration of the present disclosure, as shown in FIG. 7, the upper portion of the space between the adjacent battery modules 100 may be filled with the interposing portion 210 of the fixing member 200. Thus, the top ends of the two battery modules 100 located at both sides thereof is not movable in the lateral direction due to the interposing portion 210 of the fixing member 200. Thus, as shown in FIG. 2, it is possible to solve the problem that the top ends of the battery modules 100 are brought close to each other. In addition, in this case, the cooling channel and the buffering space between the battery modules 100 may be stably maintained.

The battery pack according to the present disclosure may further include a lower plate 300. In addition, a plurality of battery modules 100 may be mounted to an upper portion of the lower plate 300.

For example, as shown in FIG. 3, the battery pack may include a lower plate 300, and at least two battery modules 100 may be placed on the lower plate 300. At this time, the lower portion of the battery module 100 may be coupled and fixed to the lower plate 300.

For example, the bottom end of the battery module 100 may be coupled and fixed to the lower plate 300 by using bolts and/or screws. Alternatively, the bottom end of the battery module 100 may be fixed to the lower plate 300 by welding.

Here, the lower plate 300 may be a part of a pack case that configures the exterior of the battery pack. For example, the pack case may include a lower plate 300, a left plate, a right plate, a front plate, a rear plate and an upper plate. In addition, a plurality of electrical components such as a battery management system (BMS), a relay and a fuse may be accommodated in the pack case together with a plurality of battery modules 100.

As described above, in the configuration in which the battery module 100 is mounted to the upper portion of the lower plate 300 so that the lower end of the battery module 100 is fixed, the lower portion of the battery module 100 may be fixed by being coupled to the lower plate 300, and the upper portion of the battery module 100 may be fixed by being coupled to the fixing member 200. Thus, in this case, both the top end and the bottom end of the battery module 100 are connected, which may increase the stiffness of the battery module 100 with respect to up and down movements of the battery module 100. Thus, in this case, the geometrical moment of inertia of the battery pack increases, and the bending stiffness may be further improved. That is, since the upper portions of the battery modules 100 are coupled to each other by the fixing member 200 to keep the distance between them constantly within a predetermined range, the bending phenomenon of the lower plate 300 due to the load of the battery module 100 may be prevented. Thus, it is possible to effectively prevent the battery module 100, the electrical connection configuration between the battery modules 100, and the external components of the battery pack from being damaged due to the bending phenomenon of the lower plate 300.

Meanwhile, the lower plate 300 is not necessarily formed in a plate shape but may be configured in such a manner that at least one end of the lower plate 300 is bent and extends in the upward direction. Further, the lower plate 300 may be integrally formed with at least a part of the left plate, the right plate, the front plate, and/or the rear plate. For example, the pack case may be composed of a lower case having a box shape (rectangular parallelepiped shape) with an open top and an upper case covering the top opening of the lower case, and the lower plate 300 may be regarded as representing the bottom surface of the lower case.

Also, in the battery pack according to the present disclosure, the side surface coupling unit 110 of the battery module 100 may be formed in a bent plate shape.

For example, as shown in FIG. 4, the side surface coupling unit 110 of the battery module 100 may be formed in a plate shape that protrudes in a horizontal direction in a lying-down plate form parallel to the ground and is then bent in an upward direction to stand perpendicularly to the ground.

In particular, the side surface coupling unit 110 may be configured by cutting and bending a portion of the module case of the battery module 100. In other words, the module case for accommodating a plurality of secondary batteries in the battery module 100 may be formed in a substantially plate-like shape, and the side surface coupling unit 110 may be formed by cutting a part of the module case and bending the same twice in the outward direction and in the upward direction. Thus, according to the configuration of the present disclosure, the side surface coupling unit 110 may be easily and conveniently formed without attaching and fixing a separate member to the module case.

The side surface coupling unit 110 having a bent plate shape as above may be configured to face the side surface coupling units 110 of an adjacent battery module 100.

For example, seeing the configuration of FIG. 4, the side surface coupling unit 110 of the left battery module 100 and the side surface coupling unit 110 of the right battery module 100 may be formed in a bent plate shape, respectively. At this time, each side surface coupling unit 110 may have a horizontal plate lying-down flatly in the horizontal direction and a vertical plate standing in the upper and lower direction. At this time, the side surface coupling unit 110 of the left battery module and the side surface coupling unit 110 of the right battery module may be formed at the same position in the front and rear direction and in the upper and lower direction of the battery module 100, so that their vertical plates face each other.

According to the configuration of the present disclosure, the side surface coupling units 110 of the left battery module and the right battery module are provided to face each other, and thus the side surface coupling unit 110 may primarily prevent the battery modules 100 from approaching each other. For example, when an impact is applied to the right side surface of the battery pack, the side surface coupling units 110 are brought into contact with each other before the side surfaces of the right battery module and the left battery module are in contact with each other, thereby preventing the battery modules 100 from approaching. Thus, it is possible to alleviate the external impact directly transmitted to the body of the battery module 100, thereby reducing the damage of the battery module 100 due to the impact. Further, since two side surface coupling units 110 are in face-to-face contact with each other, it is possible to minimize the damage applied to each other during contact. Moreover, the bent portion between the vertical plate and the horizontal plate of the side surface coupling unit 110 may alleviate the pressure applied from the side surface.

In addition, in the above configuration, a space may be sufficiently secured between two adjacent battery modules 100. Thus, it is possible to ensure a cooling channel and a buffer space more broadly between the battery modules 100.

Figure 9:
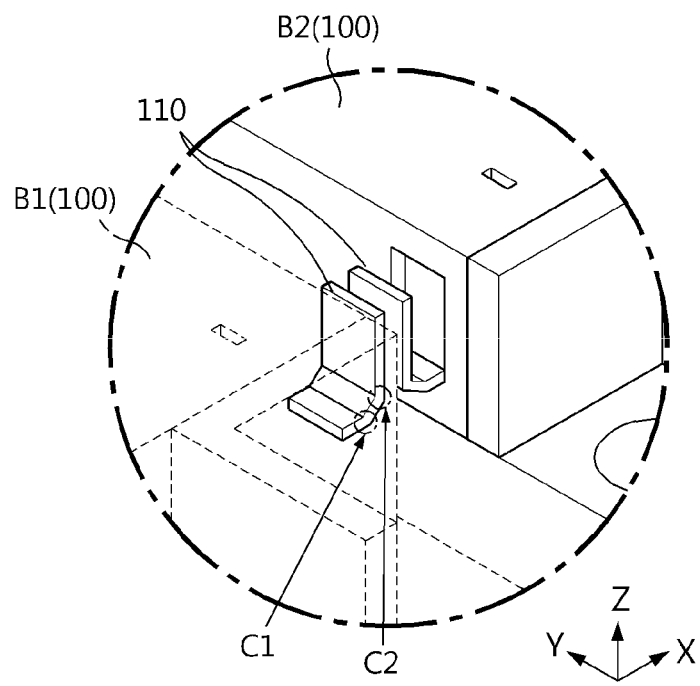
FIG. 9 is a perspective view schematically showing a partial configuration of the battery module including a side surface coupling unit according to another embodiment of the present disclosure.

FIG. 9 is a perspective view schematically showing a partial configuration of the battery module 100 including the side surface coupling unit 100 according to another embodiment of the present disclosure. In this embodiment, any features different from the former embodiment will be explained in detail, and any features common or similar to those of the former embodiment will not be explained in detail. In addition, in FIG. 9, for convenience of illustration, some components of the battery module are depicted with dotted lines.

Referring to FIG. 9, the side surface coupling units 110 having a plate shape are respectively formed at a right side upper portion of the left battery module B1 and a left side upper portion of the right battery module B2, and these two side surface coupling units 110 may be formed to face each other. At this time, the two side surface coupling units 110 may be bent at least twice. For example, the side surface coupling unit 110 of the left battery module B1 may protrude in the right horizontal direction on the right side surface of the left battery module B1, then be bent at about 45 degrees at a point C1 and then bent again at about 45 degrees at a point C2 so that its end portion stands in an upward direction. In addition, the side surface coupling unit 110 of the right battery module B2 may protrude in the left horizontal direction on the left side surface of the right battery module B2 and then bent twice at about 45 degrees so that its end portion stands in an upward direction.

As described above, in the configuration where the side surface coupling unit 110 is bent twice or more, the external pressure or impact may be more relieved due to the elasticity of the multi-step bent portion. In particular, when a force is applied to the battery module 100 in a downward direction or when a force is applied to the battery module 100 in a left and right direction, the bent portion formed at the side surface coupling unit 110 may absorb the impact in multi stages. For example, in the configuration of FIG. 9, if a force is applied to the side surface coupling unit 110 of the left battery module in the downward direction, the pressure is absorbed twice in the bent portion at the point C1 and the bent portion at the point C2 so that the stiffness against the external pressure in the upper and lower direction may be increased. In addition, in this case, the elasticity against deformation of the side surface coupling unit 110 is further increased, so that the impact absorbing force may be further enhanced.

Meanwhile, even though it has been explained that the side surface coupling units 110 having a plate shape are configured to face each other, the present disclosure is not limited thereto.

Figure 10:
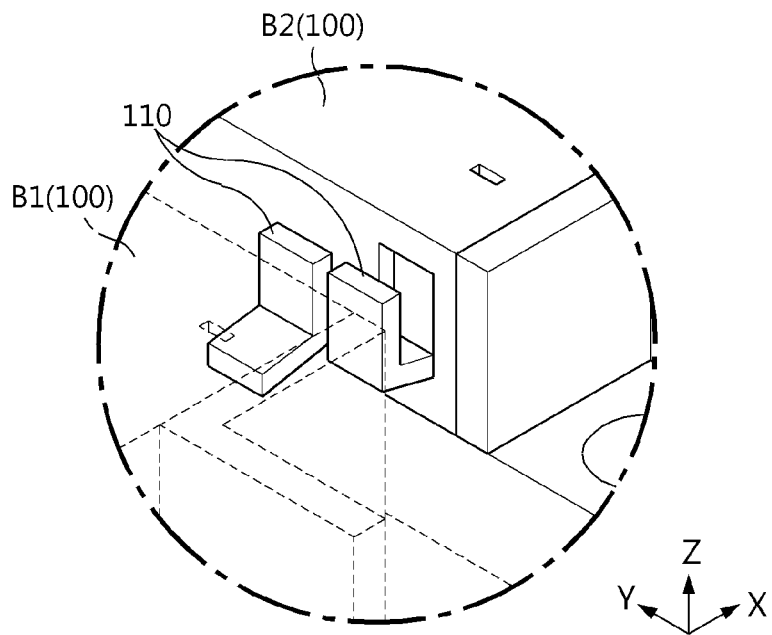
FIG. 10 is a perspective view schematically showing a partial configuration of the battery module including the side surface coupling unit according to still another embodiment of the present disclosure.

FIG. 10 is a perspective view schematically showing a partial configuration of the battery module including the side surface coupling unit 110 according to still another embodiment of the present disclosure. However, in FIG. 10, for convenience, some components of the battery module are depicted with dotted lines. In addition, FIG. 11 is a top view showing a partial configuration of the battery pack to schematically indicate a location of the side surface coupling unit 110 at the battery module depicted in FIG. 10.

Figure 11:
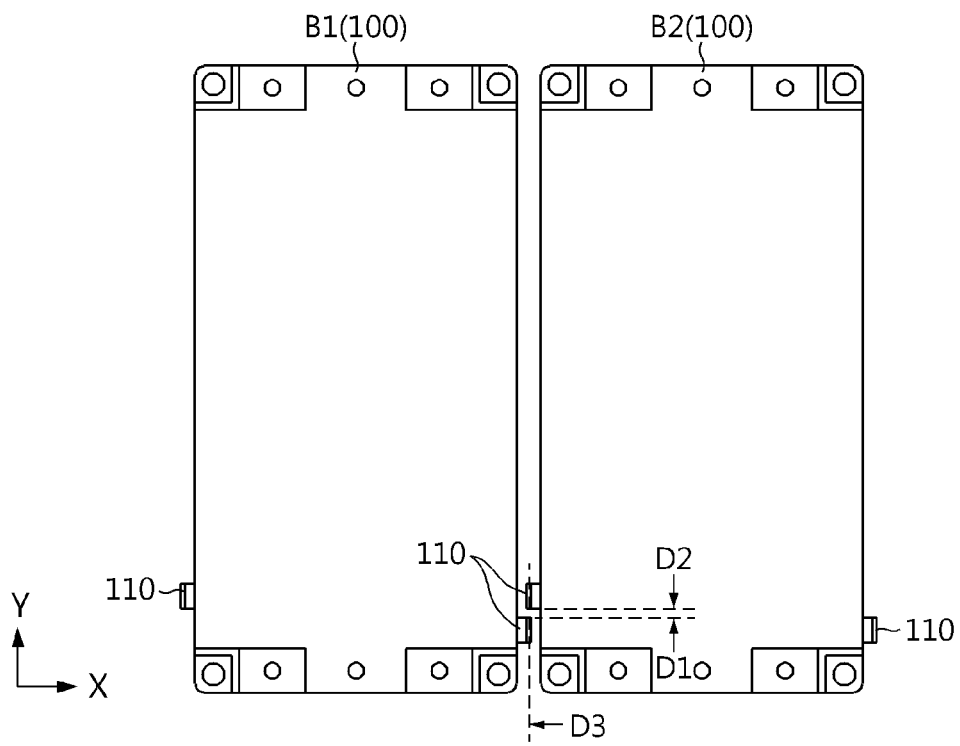
FIG. 11 is a top view showing a partial configuration of the battery pack to schematically indicate a location of the side surface coupling unit at the battery module depicted in FIG. 10.

Referring to FIGS. 10 and 11, the side surface coupling units 110 of adjacent battery modules 100 may be located at different positions in the front and rear direction (in the Y-axis direction on the figure) of the battery modules 100. That is, even though the side surface coupling unit 110 having a plate shape faces the adjacent side surface coupling unit 110 at a vertically standing portion in the former embodiments depicted in FIGS. 4 and 9, in this embodiment, however, the side surface coupling unit 110 does not face the adjacent side surface coupling unit 110 in the front and rear direction of the battery module 100.

In more detail, as shown in FIG. 11, assuming that an extension line of a rear end (a top end on the figure) of the right side surface coupling unit 110 of the left battery module B1 is D1 and an extension line of a front end (a bottom end on the figure) of the left side surface coupling unit 110 of the right battery module B2 is D2, D2 may be located at a rear side (at an upper side on the figure) of the battery module in comparison to D1.

According to the configuration of the present disclosure, the side surface coupling units 110 of the adjacent battery modules 100 are not formed at the same position in the front and rear direction of the battery module 100 but are formed at different positions, and thus it is possible to prevent the side surface coupling units 110 from interfering with each other. Thus, in this case, the gap between the battery modules 100 may be more narrowed, and thus the energy density of the battery pack may be increased.

In the embodiment in which the side surface coupling units 110 of the adjacent battery modules 100 are formed at different locations, the side surface coupling unit 110 located on a left side and the side surface coupling unit 110 located on a right side based on a single battery module 100 may be located at different positions. For example, seeing the configuration of FIG. 11, in the case of the left battery module B1, the side surface coupling unit 110 at a left side and the side surface coupling unit 110 at a right side may located at different positions in the front and rear direction (in the Y-axis direction) of the battery module.

Meanwhile, as shown in FIGS. 10 and 11, in the embodiment where the side surface coupling units 110 adjacent to each other and coupled to one fixing member 200 are located at different positions in the front and rear direction of the battery module 100, the insert grooves 211 of the fixing member 200 may also be configured to correspond to the side surface coupling units 110. This will be described in more detail with reference to FIG. 12.

Figure 12:
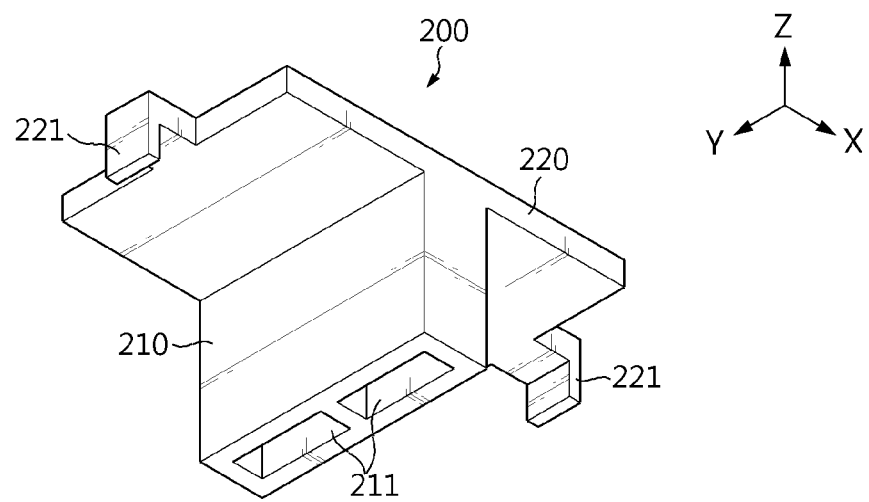
FIG. 12 is a schematic view showing an example of the fixing member coupled to the side surface coupling unit of the battery module depicted in FIGS. 10 and 11.

FIG. 12 is a schematic view showing an example of the fixing member 200 coupled to the side surface coupling unit 100 of the battery module 100 depicted in FIGS. 10 and 11. FIG. 12 may be regarded as a perspective view showing the fixing member 200, observed upwards from the below.

Referring to FIG. 12, the fixing member 200 includes one interposing portion 210, and two insertion grooves 211 may be formed in the interposing portion 210. In addition, the two insert grooves 211 may be arranged in the front and rear direction (in the Y-axis direction) of the battery module 100. Thus, as shown in FIGS. 10 and 11, the two side surface coupling units 110 arranged in the front and rear direction of the battery modules 100 between the two adjacent battery modules 100 may be inserted into different insert grooves 211 one by one.

In particular, in this case, the two side surface coupling units 110 provided between two adjacent battery modules 100 and coupled to one fixing member 200 may be located at the same position in the lateral direction (in the X-axis direction on the drawing) of the battery module 100. For example, seeing FIG. 11, the right side surface coupling unit 110 of the left battery module B1 and the left side surface coupling unit 110 of the right battery module B2 may be configured such that their center lines are aligned with a line D3.

According to the configuration of the present disclosure, since the two insert grooves 211 may be located at the central portion of the interposing portion 210 in the lateral direction at the fixing member 200, it is possible to prevent the rigidity of one side from being weakened. Also, in this case, the battery module 100 may be disposed in the lateral direction more easily by arranging the battery module 100 on the basis of the center line of the side surface coupling unit 110.

Also preferably, in the battery pack according to the present disclosure, the fixing member 200 may further includes a placing portion 220.

The placing portion 220 may be placed on the top surface of two adjacent battery modules 100. For example, as shown in FIGS. 6 and 7, in the case of the fixing member 200 of which the interposing portion 210 is inserted between two adjacent battery modules (a left battery module and a right battery module), the placing portion 220 may be placed on a part of the upper surface (a right end) of the left battery module B1 and a part of the upper surface (a left end) of the right battery module B2.

In this configuration of the present disclosure, the coupled structure between the two battery modules 100 and the fixing member 200 may be more stably maintained by the placing portion 220. In addition, the downward movement of the fixing member 200 may be restricted by the placing portion 220, and the downward force applied to the battery module 100 in a downward direction may be distributed to and supported by the placing portion 220 and the interposing portion 210.

In particular, in the battery module 100, an upper surface coupling unit 120 may be formed at an upper outer portion of the module case. For example, as shown in FIGS. 3 and 6, when the two battery modules 100 are fixed to each other by the fixing member 200, the upper surface coupling unit 120 may be formed at an upper right surface of the left battery module B1 and an upper left surface of the right battery module B2, respectively.

In this case, the placing portion 220 of the fixing member 200 may be coupled to each upper surface coupling unit 120 in a state of being placed on the upper surfaces of the two adjacent battery modules 100. That is, in the configuration of FIGS. 3 and 6, the placing portion 220 of one fixing member 200 may be coupled and fixed to both the upper surface coupling unit 120 of the left battery module B1 and the upper surface coupling unit 120 of the right battery module B2.

Here, the upper surface coupling unit 120 may be formed in a groove shape that is concave downward. In addition, the placing portion 220 may be formed in a protruding shape partially convex downwardly.

For example, as shown in FIGS. 5, 8 and 12, the fixing member 200 may have coupling protrusions 221 formed to be convex in the downward direction (in the −Z-axis direction) at both ends (a left end and a right end) of the placing portion 220. In addition, a coupling groove may be formed in the upper surface of each of the adjacent battery modules 100 as the upper surface coupling unit 120 at a position and with a shape corresponding to the coupling protrusion 221. In this case, when the fixing member 200 is coupled to the two adjacent battery modules 100, the coupling protrusion 221 of the placing portion 220 may be inserted into the coupling groove, namely the upper surface coupling unit 120. Further, the bottom end of the coupling protrusion 221 may have a hook form, and in this case, the fitting structure between the coupling protrusion 221 and the upper surface coupling unit 120 may be more strongly and stably maintained.

The placing portion 220 may be integrally formed with the interposing portion 210. For example, the placing portion 220 and the interposing portion 210 may be made of the same metal or plastic material and be formed in a continuous form from the manufacturing step. In this case, it is not needed to prepare a separate coupling or joining structure between the placing portion 220 and the interposing portion 210, and it is possible to reduce the number of coupling processes and coupling parts.

Meanwhile, the bottom surface of the placing portion 220 and the top surface of the battery module 100 may be substantially flat. In this case, the adhesive force between the bottom surface of the placing portion 220 and the top surface of the battery module 100 may be more stably secured. Further, as shown in FIGS. 5 to 8, the placing portion 220 may be configured in a plate shape that lies down substantially parallel to the ground. In this case, by reducing the thickness of the placing portion 220, the placing portion 220 may not protrude much above the battery module 100, thereby minimizing the volume increase of the battery pack and reducing the weight increase due to the fixing member 200. Also, in this case, it is also possible to improve the adhesion between the placing portion 220 and the top surface of the battery module 100.

Here, the interposing portion 210 may have a rod shape extending in one direction. For example, the interposing portion 210 may have a substantially rectangular parallelepiped bar shape extending in an upper and lower direction (in the Z direction). In addition, the interposing portion 210 may be coupled to a central lower end of the plate-shaped placing portion 220 in a state of standing substantially perpendicular to the placing portion 220. In this configuration, when the fixing member 200 is viewed from the front, the fixing member 200 may be regarded as having a substantially 'T' shape.

In this configuration of the present disclosure, it is possible to enhance the adhesion and coupling between the placing portion 220 and the top surfaces of the battery modules 100, and to allow the interposing portion 210 to stably support the battery modules 100.

The placing portion 220 may be configured to have a length in the lateral direction that is at least twice the distance between the battery modules 100. For example, seeing the configuration depicted in FIG. 7, assuming that the distance between two adjacent battery modules 100 in the lateral direction is L1 and the distance from the left end to the right end of the placing portion 220 is L2, a relation of L2≥2L1 may be formed. In particular, L2 may be at least three times as large as L1. In this configuration of the present disclosure, the contact area between the bottom surface of the placing portion 220 and the top surface of the battery module 100 may be secured to a certain level or more, thereby enhancing the adhesion and coupling between the placing portion 220 and the battery module 100 and preventing the change of distance between the battery modules 100 more stably. In particular, it is possible to prevent the distance from changing due to the weight of the battery modules 100 or an external pressure at the upper and lower portions of the adjacent battery modules 100.

However, both ends of the placing portion 220 may have a length that does not exceed the center of the battery module 100 in the lateral direction in order to avoid interference with another placing portion 220. For example, in the configuration of FIG. 3, the left end of the placing portion 220 may be present in an area between the lateral center point and the right end of the left battery module B1. In particular, the length of the placing portion 220 in the lateral direction may not exceed five times the distance between the battery modules. In this case, it is possible to eliminate interference between the placing portions 220, reduce the size and weight of the fixing member 200, and facilitate the handling of the fixing member 200, thereby enhancing the ease of coupling between the fixing member 200 and the battery module 100.

Meanwhile, even though it is illustrated in FIGS. 10 and 11 that the side surface coupling units 110 of the adjacent battery modules 100 are located at different positions in the front and rear direction of the battery module 100, it is also possible that the side surface coupling units 110 of the battery modules 100 are located at different positions in the upper and lower direction of the battery module 100. For example, the side surface coupling unit 110 of the left battery module B1 may be positioned lower than the side surface coupling unit 110 of the right battery module B2 so that the side surface coupling units 110 of the battery modules do not face each other.

Figure 13:
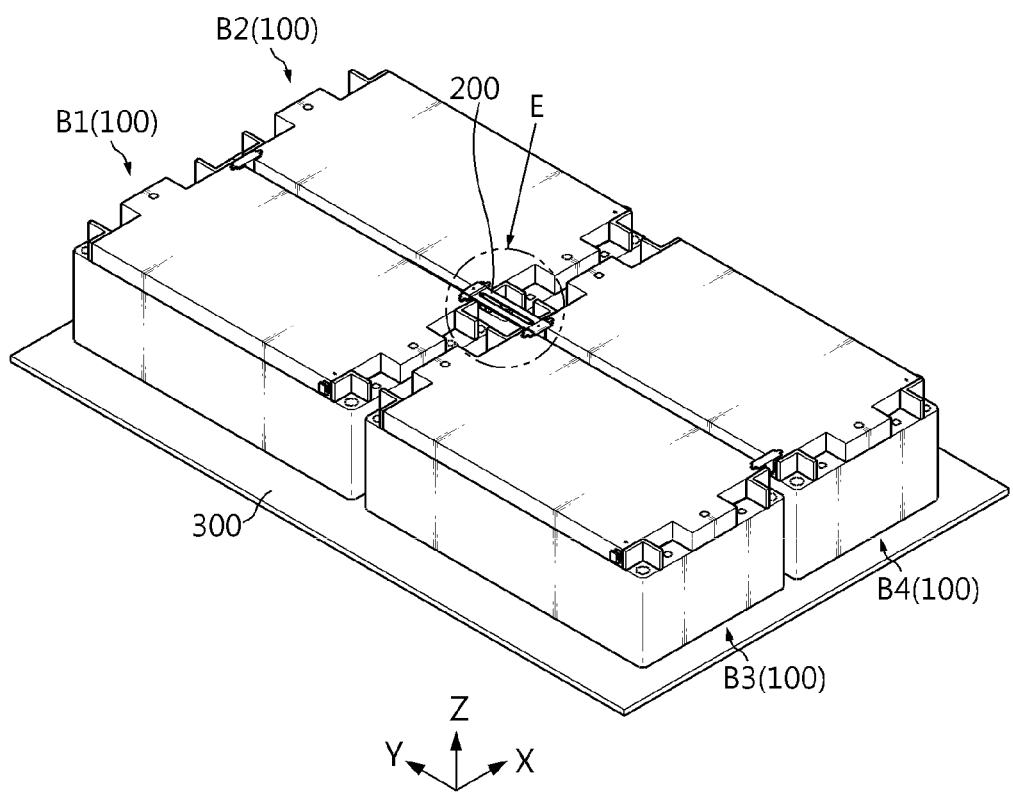
FIG. 13 is a perspective view schematically showing a partial configuration of a battery pack according to another embodiment of the present disclosure.
Figure 14:
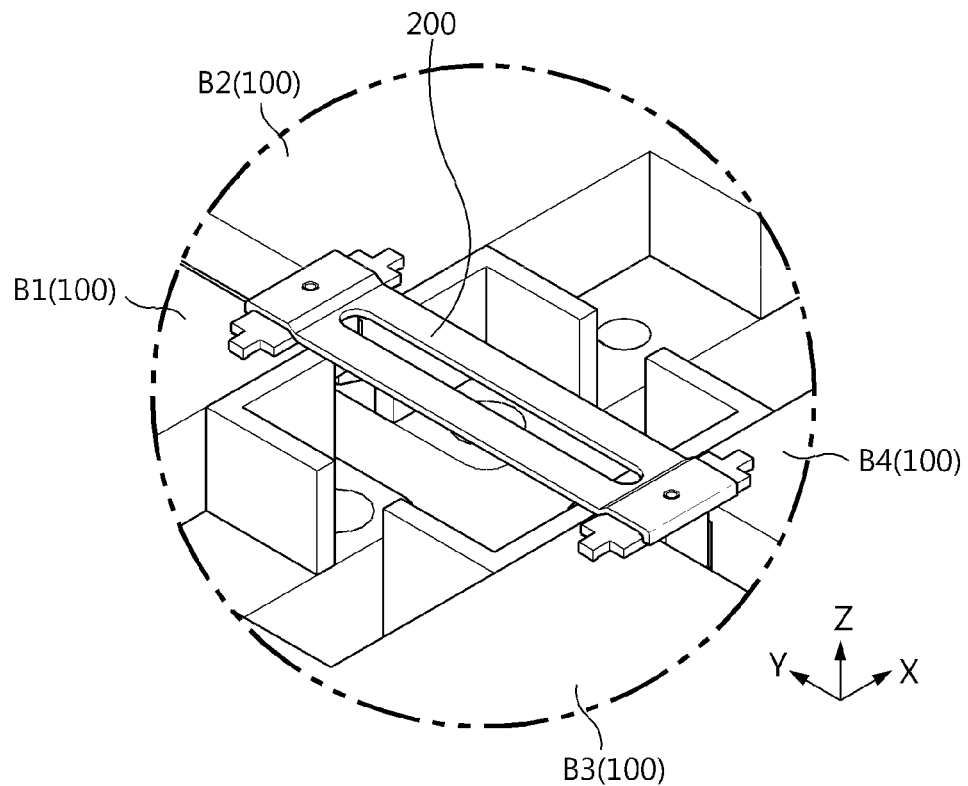
FIG. 14 is an enlarged view showing a portion E of FIG. 13.

FIG. 13 is a perspective view schematically showing a partial configuration of a battery pack according to another embodiment of the present disclosure, and FIG. 14 is an enlarged view showing a portion E of FIG. 13.

Referring to FIGS. 13 and 14, two or more battery modules 100 arranged in the lateral direction may be arranged in two or more rows in the front and rear directions.

More specifically, a battery module B1 and a battery module B2 are arranged in the lateral direction (in the X-axis direction on the drawing) to form one row (a first row) so that their side surfaces face each other, and a battery module B3 and a battery module B4 are also arranged in the lateral direction to form another row (a second row) so that their side surfaces face each other. In addition, the first and second rows are arranged to be spaced apart at a predetermined distance from each other in the front and rear direction (in the Y-axis direction) of the battery module. Here, the direction in which the rows are arranged may be orthogonal to the direction in which the battery modules are arranged in one row. That is, seeing the configuration of FIG. 13, when a plurality of battery modules, for example four battery modules, may be arranged in two rows on one horizontal plane (an X-Y plane), the rows are arranged in the Y-axis direction, and the battery modules in each row may be arranged in the X-axis direction that is perpendicular to the Y-axis direction.

In the arrangement of the battery modules, the fixing member 200 may couple and fix two battery modules 100 arranged in the lateral direction in the same row and simultaneously couple and fix battery modules 100 in another row adjacent thereto. That is, seeing the configuration of FIGS. 13 and 14, one fixing member 200 may couple and fix the battery modules B1, B2 arranged so that their side surfaces are adjacent in the first row as well as couple and fix the battery modules B3, B4 arranged so that their side surfaces are adjacent in the second row that is adjacent to the first row. Moreover, the battery modules B1, B2 in the first row and the battery modules B3, B4 of the second row may be coupled and fixed to each other by a single fixing member 200. That is, in this configuration of the present disclosure, four battery modules B1, B2, B3, B4 may be coupled and fixed by one fixing member 200 in total.

In this configuration of the present disclosure, one fixing member 200 may fix two battery modules belonging to the same row and two battery modules belonging to another row together. Thus, a large number of battery modules may be coupled and fixed by a small number of fixing members 200. In addition, since not only adjacent battery modules in the same row but also adjacent battery modules in another row may be coupled and fixed, in the battery pack in which battery modules are arranged in a plurality of rows and columns, the battery modules may be coupled more securely, and the stiffness against bending may be secured more stably.

In this configuration, the fixing member 200 may include two interposing portions 210 and a connection portion 230. This configuration of the fixing member 200 will be described in more detail with reference to FIG. 15.

Figure 15:
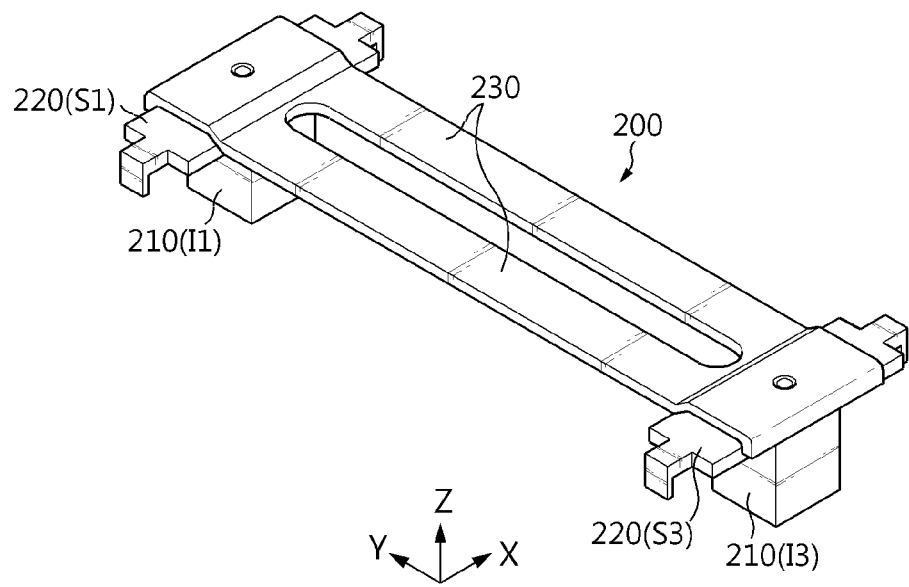
FIG. 15 is a perspective view schematically showing a fixing member according to another embodiment of the present disclosure.

FIG. 15 is a perspective view schematically showing a fixing member 200 according to another embodiment of the present disclosure. The fixing member 200 of FIG. 15 may be identical to the fixing member 200 applied in FIGS. 13 and 14.

Referring to FIG. 15, the fixing member 200 may include a connection portion 230 and two interposing portions 210.

Here, two interposing portions 210 may be coupled to different pairs of battery modules 100 one by one. For example, in FIG. 15, one interposing portion 210 is provided at each of a front end and a rear end, and the interposing portion I1 located at the rear end may be interposed between the right side surface of the battery module B1 and the left side surface of the battery module B2 in the configuration of FIG. 14. In addition, the interposing portion I3 located at the front end in FIG. 15 may be interposed between the right side surface of the battery module B3 and the left side surface of the battery module B4 in the configuration of FIG. 14.

The connection portion 230 is formed to extend in the front and rear direction (in the Y-axis direction on the drawing) of the battery module 100, so that its rear end is connected and fixed to a rear end interposing portion I1 and its front end is connected and fixed to a front end interposing portion I3. Thus, the connection portion 230 may fix the interposing portions in different rows to each other.

Moreover, in this configuration, the fixing member 200 may also include two placing portions 220. For example, as shown in FIG. 15, the fixing member 200 may include a rear end placing portion S1 and a front end placing portion S3, spaced apart from each other by a predetermined distance in the front and rear direction of the battery module 100. In this case, the rear end placing portion S1 may be placed on the upper surface of the battery module B1 and on the upper surface of the battery module B2 in the first row in FIG. 14. In addition, the front end placing portion S3 may be formed on the upper surface of the battery module B3 and the upper surface of the battery module B4 in the second row in FIG. 14.

In the configuration in which the two interposing portions 210 and the two placing portions are provided in the fixing member 200, the connection portion 230 may be connected and fixed to the upper portion of the placing portion. At this time, the connection portion 230 may be coupled to the placing portion by fastening such as bolting or welding. That is, the connection portion 230 may be manufactured separately from the two placing portions, and then both ends of the connection portion 230 may be coupled and fixed to these placing portions later. Alternatively, the connection portion 230 may be configured to have two placing portions in an integrated form from the time of manufacture.

Meanwhile, even though the various drawings depict that only one fixing member 200 is coupled between two battery modules 100, but the present disclosure is not necessarily limited thereto.

Figure 16:
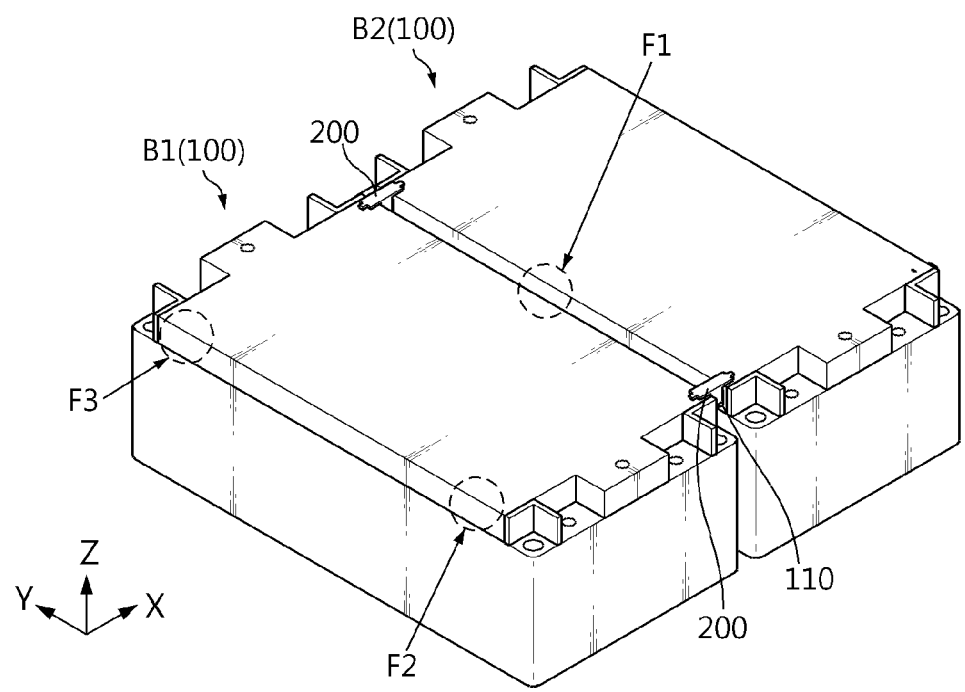
FIG. 16 is a perspective view schematically showing a partial configuration of a battery pack according to another embodiment of the present disclosure.

FIG. 16 is a perspective view schematically showing a partial configuration of a battery pack according to another embodiment of the present disclosure.

Referring to FIG. 16, two battery modules 100 are arranged in the lateral direction so that their side surfaces face each other, and the two battery modules 100 may be coupled and fixed by two fixing members 200. Here, one fixing member 200 may couple and fix the two battery modules at the rear ends of the battery module B1 and the battery module B2, and the other fixing member 200 may couple and fix the two battery modules at the front ends of the battery module B1 and the battery module B2. In this case, the side surface coupling unit 110 may be provided at the front and rear ends of the right side surface of the battery module B1 and at the front and rear ends of the left side surface of the battery module B2, respectively, and the fixing member 200 may be coupled thereto.

According to this configuration of the present disclosure, the front end and the rear end of the two battery modules 100 are coupled and fixed by the fixing member 200, respectively, so that both the front end and the rear end of the battery module 100 may be stably coupled, and the rigidity may be further improved. Thus, in this case, the bending phenomenon may be effectively prevented at both the front end and the rear end of the battery module 100. Also, in this configuration of the present disclosure, it is possible to prevent the battery module 100 from rotating in the horizontal direction.

Meanwhile, as indicated by F1 in FIG. 16, the side surface coupling unit 110 is also formed at the center portion of the battery module 100 in the front and rear direction (in the Y-axis direction on the drawing), and the fixing member 200 may be coupled to the side surface coupling unit 110. In the battery pack of the present disclosure, the coupling between the battery modules 100 is further improved and the bending phenomenon may be prevented more effectively.

In addition, as indicated by F2 and F3 in FIG. 16, the side surface coupling unit 110 may also be provided at the left side surface of the battery module B1. In this case, it may be regarded that the side surface coupling unit 110 is provided on both the right side surface and the left side surface based on one battery module B1. At this time, when another battery module is additionally disposed at the left side of the battery module B1, another fixing member 200 may be coupled to the side surface coupling unit 110 indicated by F2 and/or F3, so that the additional battery module and the battery module B1 are coupled to each other.

According to an embodiment of the present disclosure, the battery module 100 may be easily added successively. Moreover, according to an embodiment of the present disclosure, the battery modules 100 may be stably coupled to each other by a simple work in which the battery modules 100 are arranged side by side and the fixing member 200 is inserted into the side surface coupling units 110 in a downward direction. This may also increase the stiffness. In particular, the bending phenomenon caused by a pressure or impact applied to the battery module 100 the upper and lower direction may be effectively prevented.

Moreover, the fixing member 200 for fixing the top ends of the battery modules to each other has a small size and a low weight, and the same fixing member 200 may be used regardless of the number of battery modules. That is, the fixing member 200 has excellent compatibility and thus may be easily applied to various kinds of battery packs including different numbers of battery modules.

The battery pack according to the present disclosure may be applied to vehicles such as electric vehicles and hybrid electric vehicles. That is, the vehicle according to the present disclosure may include the battery pack according to the present disclosure. In particular, in the case of an electric vehicle, the battery pack is highly likely to be exposed to a lot of vibration or strong impact. Thus, when the battery pack according to the present disclosure is applied to the electric vehicle, the stiffness may be stably secured even against the vibration or impact, and thus it is possible to effectively prevent the bending phenomenon from being generated at the battery pack.

Meanwhile, the terms indicating up, down, left, right, front and rear directions are used in the specification, but it is obvious to those skilled in the art that these merely represent a relative location and may vary based on a location of an observer or a shape in which an object is placed.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

100: battery module
110: side surface coupling unit, 120: upper surface coupling unit
200: fixing member
210: interposing portion, 211: insert groove, 220: placing portion, 230: connection portion
300: lower plate

What is claimed is:

1. A battery pack, comprising:
a plurality of battery modules, each battery module including at least one secondary battery accommodated in a module case and a side surface coupling unit provided at an outer side portion of the module case, the plurality of battery modules being arranged in a lateral direction so that side surfaces of two adjacent battery modules face each other with intervals therebetween, each side surface coupling unit is provided at a side upper portion of the module case and has a protruding shape that has a first portion that protrudes in the lateral direction and a second portion that is bent from the first portion to extend along the outer side portion of the module case; and
a fixing member, the fixing member having an interposing portion interposed between the side surfaces of the two adjacent battery modules and coupled to the side surface coupling units of the two adjacent battery modules so that the two or more battery modules are coupled and fixed, the interposing portion of the fixing member having an insert groove elongating in an upper and lower direction and having an open bottom,
wherein the second portions of the side surface coupling units of the two adjacent battery modules are inserted into the insert groove of the fixing member.

2. The battery pack according to claim 1,
wherein the fixing member has two insert grooves so that the side surface coupling units of different battery modules are inserted into the two insert grooves, respectively.

3. The battery pack according to claim 1,
wherein both surfaces of the interposing portion of the fixing member are respectively in contact with side surfaces of the two battery modules.

4. The battery pack according to claim 1,
wherein the side surface coupling unit of each battery module has a bent plate shape to face a side surface coupling unit of an adjacent battery module.

5. The battery pack according to claim 1,
wherein the side surface coupling unit of each battery module has a bent plate shape so that the side surface coupling units of adjacent battery modules are provided at different locations in a front and rear direction of the battery modules.

6. The battery pack according to claim 1,
wherein each battery module includes an upper surface coupling unit formed at an upper outer portion of the module case, and
wherein the fixing member further includes a placing portion placed on upper surfaces of two adjacent battery modules and coupled to the upper surface coupling units of the two adjacent battery modules.

7. The battery pack according to claim 6,
wherein the upper surface coupling unit has a groove shape that is concave downwards, and
wherein the placing portion has a protrusion shape that is partially convex downwards.

8. The battery pack according to claim 6,
wherein the placing portion has a lying-down plate shape, and the interposing portion has a rod shape standing perpendicular to the placing portion at a central lower end of the placing portion.

9. The battery pack according to claim 1,
wherein the plurality of battery modules arranged in the lateral direction are arranged in two or more rows in the front and rear direction, and
wherein the fixing member couples and fixes battery modules arranged in different rows adjacent to each other.

10. The battery pack according to claim 9,
wherein the fixing member includes two interposing portions so that one interposing portion is coupled to a pair of battery modules and the other interposing portion is coupled to another pair of battery modules in an adjacent different row, and further includes a connection portion elongating in a front and rear direction of the battery module so that both ends of the connection portion are respectively connected and fixed to the interposing portions located at the pairs of battery modules in different rows.

11. A vehicle, comprising:
the vehicle, and
the battery pack defined in claim 1 located on the vehicle.

* * * * *